(12) United States Patent
Mueller (10) Patent No.: US 6,244,656 B1
(45) Date of Patent: Jun. 12, 2001

(54) VEHICLE SEAT AND OPERATION METHOD OF SUCH A VEHICLE SEAT

(75) Inventor: Olaf Mueller, Ruesselsheim (DE)

(73) Assignee: Inova GmbH Technische Entwicklung, Ruesselsheim (DE)

( * ) Notice: Subject to any disclaimer, the term of this patent is extended or adjusted under 35 U.S.C. 154(b) by 0 days.

(21) Appl. No.: 09/197,498

(22) Filed: Nov. 23, 1998

(30) Foreign Application Priority Data

Nov. 21, 1997 (DE) .......................................... 297 20 734 U (51) Int. Cl.[7] ...................................................... B60N 2/42
(52) U.S. Cl. .................................. 297/216.13; 297/216.19
(58) Field of Search ........................ 297/216.13, 216.14, 297/216.18, 216.19

(56) References Cited

U.S. PATENT DOCUMENTS

| | | | |
|---|---|---|---|
| 5,290,089 | * | 3/1994 | Oleszko et al. .................. 297/216.14 |
| 5,437,494 | * | 8/1995 | Beauvais .......................... 297/216.19 |
| 5,449,214 | * | 9/1995 | Totani .......................... 297/216.13 X |
| 5,676,421 | * | 10/1997 | Brodsky ........................... 297/216.13 |
| 5,722,722 | * | 3/1998 | Massara ...................... 297/216.13 X |
| 5,810,417 | * | 9/1998 | Jesaanont .......................... 297/216.13 |
| 5,823,619 | * | 10/1998 | Helig et al. ...................... 297/216.13 |

* cited by examiner

Primary Examiner—Anthony D. Barfield
(74) Attorney, Agent, or Firm—Martin Fleit (57) ABSTRACT

A motor vehicle seat has a seat part and a backrest part, as well as protection devices which contain a backrest adjusting device which can be released in the event of a rear impact and which, after its release, controls the backrest part such that the latter counteracts an occupant's sliding-up along the backrest part as the result of the rear impact. In addition, an operating process for a motor vehicle seat with a seat part and a backrest part is provided. In the event of a rear impact, the backrest part is controlled into a protective position so that it counteracts an occupant's sliding-up along the backrest part as the result of the rear impact.

39 Claims, 6 Drawing Sheets

VEHICLE SEAT AND OPERATION METHOD OF SUCH A VEHICLE SEAT

BACKGROUND AND SUMMARY OF THE INVENTION

The invention relates to a motor vehicle seat having a seat part and a backrest part as well as to an operating process for such a motor vehicle seat.

In the event of rear impact motor vehicle accidents, there is the risk that, as the result of the impact, occupants may slide up along the backrest part of their vehicle seat. The sliding-up will occur because, in the case of a rear impact, the backrest will bend toward the rear and will therefore form a slope.

In the event of a rear impact motor vehicle accident, an occupant is pushed so far upwards that his seat is virtually pushed through under him and such that his head strikes against the vehicle ceiling or is at least pushed beyond the headrest so that the latter no longer offers support. The consequences are serious head and/or spinal column injuries which may even be lethal. Currently, there is no effective protection in this respect.

It is therefore an object of the invention to provide a motor vehicle seat and an operating process therefor in order to better protect an occupant.

According to the invention, this is achieved by means of a motor vehicle seat as well as by means of an operating process for a motor vehicle seat. Preferred and advantageous further developments of the invention are described herein.

In the case of the motor vehicle seat according to the invention which has a seat part, a backrest part and protection devices, the protection devices contain a backrest adjusting device which can be released in the event of a rear impact and, after its release, controls the backrest part such that the latter counteracts an occupant's sliding-up along the backrest part because of the rear impact. In particular, the backrest part is adjusted to be as straight as possible and therefore counteracts the bending-back of the backrest part because of the rear impact.

The backrest part, which in the event of a rear impact, normally becomes a slope, can be stabilized by means of the seat adjusting device according to the invention.

According to a preferred further development of the invention, it is provided in the case of a motor vehicle seat that the backrest adjusting device contains release devices which either do or do not release the control of the backrest as a function of the force and/or the type of the rear impact and of the occupant's weight on the motor vehicle seat. The release devices preferably contain a load limiting device coupled to the backrest part.

The invention can be implemented particularly advantageously by means of a motor vehicle seat in the case of which the backrest part has a buttocks end which faces the seat part and a shoulder end which faces away from the seat part, and in the case of which the backrest adjusting device, after its release, acts toward a swivelling of the buttocks end and the shoulder end of the backrest part relative to one another such that, with respect to the respective position before the rear impact, the buttocks end can be adjusted toward the rear impact and/or the shoulder end can be adjusted away from the rear impact. According to a preferred further development thereof, it is provided that the backrest adjusting device is designed such that, after its release, it causes an adjustment of the backrest part from the seat part in the upward direction. By means of these designs, the effect of the invention is implemented in a particularly simple and good manner.

In the case of the above-explained preferred and advantageous embodiments of the vehicle seat, an implementation is permitted in that the backrest part is connected with the seat part on both sides of the motor vehicle seat by way of one holder respectively, and in that the backrest adjusting device contains forced control which acts between the seat part and the holders of the backrest part.

Preferably, the forced control on both sides of the vehicle seat contains one forward and one rearward lever, respectively, which are in each case rotatably disposed on the seat part by means of their lower ends and on the corresponding holder by means of their upper ends, and the rearward levers of which, being closer to the vehicle rear, are longer than the forward levers. In this embodiment, when the backrest adjusting device is not released, the forward and rearward levers extend in the direction away from the vehicle rear diagonally upward and at least essentially in parallel to one another. Furthermore, when the backrest adjusting device is released, the upper ends of the forward and rearward levers can be adjusted in the direction of the rear impact. This advantageously permits a solid and effective adjustment of the backrest part.

It is also particularly preferable for the seat adjusting device of the motor vehicle seat according to the invention to contain driving devices which at least promote or cause an action upon the backrest part after the release of the backrest adjusting device so that the backrest part counteracts an occupant's sliding-up as the result of the rear impact. Thus, the backrest part can be adjusted in a rapid and reliable manner. The driving devices are preferably coupled with the forced control. As an alternative or in addition, the driving devices may contain at least one pyrotechnical adjusting cylinder. Such pyrotechnical adjusting cylinders may be provided on both sides of the motor vehicle seat. However, it may be sufficient for a pyrotechnical adjusting cylinder to be used on one side of the motor vehicle seat, each pyrotechnical adjusting cylinder preferably being operatively coupled, on the one side, in a stationary manner on the seat part and, on the other side, on the upper end of the rearward lever.

Instead of using an additional pyrotechnical adjusting cylinder as a driving device, a pyrotechnical adjusting cylinder may also be used which is part of a side air bag system accommodated in the motor vehicle seat. Such an adjusting cylinder is designed for, on the one hand, pulling a side air bag out of its accommodation space into an operative position. This is done by means of a tension cable which is coupled on one side in the area of the shoulder end of the backrest part and on the other side with the adjusting cylinder which, after a triggering of the side air bag system, tensions the tension cable toward the forward free end of the seat part in order to, on the other hand, act upon the backrest part by the tensioning of the tension cable after the release of the backrest adjusting device so that the backrest part counteracts an occupant's sliding-up as the result of the rear impact. Further details concerning the development of suitable side air bag systems are disclosed in German Patent Applications 197 38 728.4 and 198 45 992.0, the latter being based on German Utility Model Application 297 17 795.8, as well as the analogous U.S. patent applications with the Ser. No. 09/017,858, with the title "AIR BAG DEVICE IN A VEHICLE AND METHOD FOR ACTIVATING AN AIR BAG DEVICE", filed on Feb. 3, 1998, and Ser. No. 09/165,744 with the title "SIDE AIR BAG DEVICE, METHOD FOR OPERATION THEREOF AND VEHICLE SEAT THEREWITH, filed on Oct. 6, 1998, which all originate from the present inventor and applicant, and to whose contents reference is made hereby concerning the characteristics for developing the side air bag system, if these characteristics can be used in connection with the backrest part adjustment according to the present invention. For avoiding comprehensive citations, the corresponding characteristics and further developments are included completely in the present documents to the extent of the reference.

In connection with the driving devices, it is also preferred for these driving devices, for the purpose of their activation, to be coupled with sensor devices for detecting a rear impact. In this case, it may advantageously be provided that the sensor devices are coupled with the release devices in order to trigger the driving devices only when the backrest adjusting devices are released.

Within the scope of another preferred embodiment of the invention, the backrest adjusting device, which can be released in the event of a rear impact, may contain preadjusting devices which are coupled with sensor devices for detecting an imminent rear impact and, after the release of the backrest adjusting device, adjust the backrest part such that the latter counteracts an occupant's sliding-up because of the rear impact. This is preferably achieved in that the preadjusting devices contain an electric or hydraulic drive which is coupled with a forced control of the backrest part, that the backrest part has a buttocks end facing the seat part and a shoulder end facing away from the seat part, and that the forced control after the release of the backrest adjusting device by means of the electric or hydraulic drive causes a swivelling of the buttocks end and of the shoulder end of the backrest part relative to one another such that, with respect to the respective position before the effect of the preadjusting devices, the buttocks end can be adjusted toward the rear impact and/or the shoulder end can be adjusted away from the rear impact. Another preferable further development provides that the forced control after the release of the backrest adjusting device by means of the electric or hydraulic drive causes an adjusting of the backrest part from the seat part in the upward direction.

It is also advantageous for the backrest adjusting device to contain absolute and/or relative limiting devices for limiting the effect and/or movement of the control of the backrest part. As a result, it is avoided that the adjustment of the backrest part is too wide.

It is also advantageous for the release and/or the activation of the backrest part adjustment to be coupled with the triggering of additional safety devices. The combination of the backrest part adjustment with a side air bag or thorax air bag was explained in connection with an above-mentioned preferred embodiment of the invention, in which case not only the combination of the effects is utilized but also that of the functions. In this case, a combined triggering mechanism is also within the scope of the present invention, with respect to which reference is made to the above-indicated older applications, and by means of this reference, the contents of the above-mentioned older applications are included to their full extents in the present documents in order to avoid comprehensive citations. An adjustable headrest can also be triggered together with the backrest part adjustment. In particular, like the backrest part adjustment according to the present invention, the headrest adjustment can also take place preventively before a rear impact. Another combination variant of the backrest part adjustment according to the invention takes place together with a headrest air bag and/or together with belt tightening devices whose triggering can be utilized for triggering the backrest part adjustment of the present invention, or the activation of this backrest part adjustment may trigger a headrest air bag and/or belt tightening devices. It is also possible that several safety devices are activated or triggered in parallel. In particular, the same sensor devices can be used for the triggering of the backrest part adjustment and of additional safety devices. Preferably, the movement of the backrest part adjustment can, for example, be used for the triggering and/or causing of headrest adjustment.

With respect to details concerning the techniques to be combined by means of the present invention, reference is made to the older German Patent Applications 196 41 224.2, 197 07 998.9, 197 38 727.6 and 198 44 413.3 as well as the older U.S. patent applications with the Ser. No. 08/946.579, with the title "DRIVING DEVICE, ESPECIALLY FOR TIGHTENING A SAFETY BELT IN A MOTOR VEHICLE", filed on Oct. 7, 1997, and Ser. No. 09/031,914, with the title "VEHICLE SEAT", filed on Feb. 27, 1998. All these older applications originate from the inventor and the applicant of the present application and, in order to avoid comprehensive citations, are included with their complete contents in the present documents, if the characteristics and embodiments which are indicated in the older applications can be combined with the present invention.

The invention also contains an operating process for a motor vehicle seat having a seat part and a backrest part. In the event of a rear impact, the backrest part is controlled into a protective position so that it counteracts an occupant's sliding-up along the backrest part as the result of the rear impact.

As a preferred further development, it is possible that, when the motor vehicle seat is mounted in the driving direction, in the event of a rear impact, the backrest part is adjusted on its buttocks end toward the rear impact and/or, on its shoulder end, away from the rear impact into a protective position with respect to the adjustment of the backrest part before the rear impact. This process can be further developed in that, in the event of a rear impact, the backrest part is adjusted from the seat part additionally in the upward direction into a protective position with respect to the adjustment of the backrest part before the rear impact.

Preferably, in the case of the process according to the present invention, the achieving of the protective position of the backrest part is at least promoted or caused by means of sensor devices for detecting a rear impact and driving devices coupled therewith. As an alternative or in addition, the backrest part can be adjusted into the protective position before an imminent rear impact by means of sensor devices for detecting an imminent rear impact and preadjusting devices coupled therewith.

Additional advantageous further developments of the invention are found in the embodiments which will be described in the following in the manner of examples with reference to the drawings.

DETAILED DESCRIPTION OF THE DRAWINGS

By means of the description and the drawings, identical or similar parts and components as well as elements and subassemblies which have the same or similar effect, particularly those which have the same reference numbers in all figures of the drawing, can easily be recognized by a person skilled in the art, even if they are not explicitly indicated or discussed in the pertaining description. Special characteristics which are discussed only in connection with individual embodiments can also be combined with other embodiments of the invention by comparison and on the basis of the knowledge of a person skilled in the art. The invention is not limited to the embodiments indicated in the following and shown in the drawings, but comprises any modifications, variations and substitutions which can be recognized by a person skilled in the art, particularly within the scope of his technical knowledge and of the above explanations of the invention and of the claims.

Figure 1:
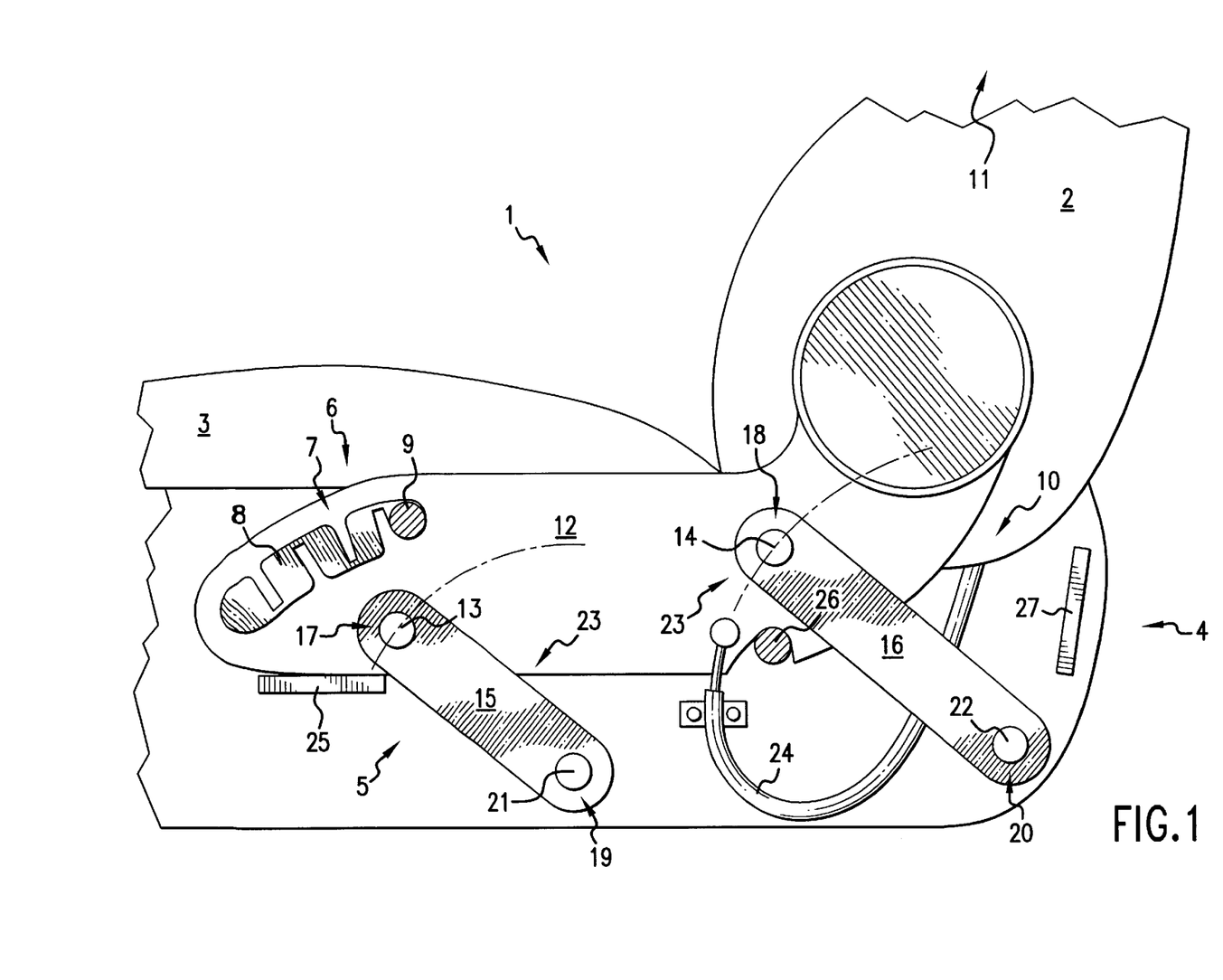
FIG. 1 is a schematic partial lateral view of a motor vehicle seat with a backrest adjusting device in a first embodiment.

FIG. 1 illustrates a first embodiment of a motor vehicle seat 1 which has a backrest part 2 and a seat part 3. In the case of the current front seats in motor vehicles, which are mounted in the driving direction, in the event of a rear crash or impact, the backrest or the backrest part 2 is bent rearward. As the result, an occupant (not shown) is lifted upward as if on a slide. Because of this lifting/sliding action a headrest (not visible), which is arranged on the upper free end of the backrest part 2 will be in a position which is too low relative to the occupant's head (not shown) and can no longer support the head. As a function of the height of the seat position (not visible), the height of the occupant compartment (not shown) and the occupant's height, there is even the risk that the latter may be pushed with his head against the vehicle ceiling (not shown). This may result in serious and even lethal injuries to the occupant. Seat belts cannot offer sufficient protection in this case.

The motor vehicle seat 1 illustrated in FIG. 1 contains a protection device 4 which contains a backrest adjusting device 5 which can be released in the event of a rear impact. After its release, the backrest adjusting device 5 controls the backrest part 2 such that the latter counteracts an occupant's (not shown) tendency to slide-up along the backrest part 2 as the result of the rear impact. The term "counteracts" was selected because an actual adjustment of the backrest part 2 of the motor vehicle seat 1 must not be achievable in every case. In the event of a particularly severe rear impact, for example, in conjunction with a very heavy occupant, it is possible that the backrest adjusting device 5 just compensates the impact-caused stress to the backrest part 2 toward the rear so that, although with respect to a backrest position preadjusted before the rear impact, no change of position of the backrest part 2 is achieved by the backrest adjusting device 5, on the whole, the course of the accident is considerably improved for the occupant (not shown) since the backrest part 2 is not adjusted or bent rearward to a correspondingly extensive degree. The supporting and protecting function of the backrest part 2 is maintained at least corresponding to the backrest position adjusted before the rear impact.

The backrest adjusting device 5 contains release devices 6 in the form of a load limiting device 7 which, in the embodiment illustrated in FIG. 1, consists of a wave-shaped guiding slot 8 with a holding pin 9 moving in it. The holding pin 9 has a diameter which corresponds to the full width of the guiding slot 8 between the opposite maxima of its wave shape. In the event of a rear impact, an occupant is pressed against the backrest part 2, specifically the most intensively in the area of the center of gravity of his body which is situated in the sitting position on the motor vehicle seat 1 at the level of the occupant's buttocks. Thus, as the result of the rear impact, the occupant first presses essentially against the lower end of the backrest part 2, which is also called the buttocks end 10 of the backrest part 2. It is only at a later point in time of the course of the accident that also the remaining upper body of the occupant applies such a considerable force against the other end of the backrest part 2, that is, the shoulder end 11 of the backrest part 2, that, on the basis of the lever length in the form of its height, the latter is bent rearward or adjusted.

The initial force onto the buttocks end 10 of the backrest part 2 pushes the latter rearward against the effect of the load limiting device 7. If the force of a rear impact and/or an occupant's weight is sufficiently large, the holding pin 9 will force itself against the resistance of the wave shape of the guiding slot 8 through this guiding slot and therefore permit an adjusting movement of the backrest part 2.

In the area of its buttocks end 10, the backrest part 2 is mounted on both sides on a holder 12, which can also be called a backrest mounting. The slope of the backrest part 2 can be adjusted with respect to the holders 12 in order to permit a seat position which is as optimal as possible during the driving of the motor vehicle (not shown). In a forward part with respect to the seat direction, the holders 12 contain the load limiting devices 7. However, it may also be sufficient to provide a load limiting device 7 in only one holder 12. Furthermore, a forward bearing journal 13 and a rearward bearing journal 14 are mounted on the two holders 12 (only one is visible in the figure). On the bearing journals 13 and 14, a forward lever 15 and a rearward lever 16 are correspondingly swivellably disposed in each case by means of their upper end 17 and 18, the rearward lever 16 being longer than the forward lever 15. At their respective lower ends 19 and 20, the forward lever 15 and the rearward lever 16 are swivellably disposed on bearing journals 21 and 22 which are mounted on the seat part 3 of the motor vehicle seat 1. In a starting position, which is illustrated in FIG. 1, the two levers 15 and 16 are approximately in parallel and extend from the rear toward the front diagonally upwards.

Since the rearward lever 16 is longer than the forward lever 15, when the holder 12 is moved toward the rear, it is tilted or swivelled. By means of this tilting of the holder 12, the backrest part 2, which is connected with it in a positionally stable manner, is also tilted or swivelled, specifically such that the shoulder end 11 of the backrest part 2 moves toward the front, that is, away from the rear of the vehicle, and the buttocks end 10 of the backrest part 2 moves rearward toward the rear of the vehicle. Simultaneously, because of the arrangement and further development of the levers 15 and 16, an upward movement of the backrest part 2 also takes place. Therefore, for the purpose of a shock absorption, the backrest part 2 yields slightly in the buttocks area, while, in the shoulder area, it moves an occupant's upper body toward the front and thus counteracts the effect according to which the occupant's upper body adjusts or bends backrest part 2 in the course of the accident toward the rear. The backrest part is virtually pulled in a protective manner over the occupant when a rear impact occurs. It can basically be operated by means of the force applied by the occupant's buttocks in the event of a rear impact since this force presses the buttocks end 10 of the backrest part 2 against the force of the load limiting device 7 toward the rear until the load limiting device 7 yields, and then, because of the forced control 23, which is formed by the levers 15 and 16, the backrest part 2 in a forced manner carries out the above-mentioned swivelling movement.

FIG. 1 also shows a Bowden cable 24 by means of which an adjustable headrest, which is not visible in this figure, can be brought into a protective position. Furthermore, forward supports 25 and 26 are provided for the holder 12 against loads from the rear in the event of a rear impact or for supporting the backrest part 2, as well as a rearward stop 27 for the rearward lever 16 as limiting devices for the backrest part adjustment.

Figure 2:
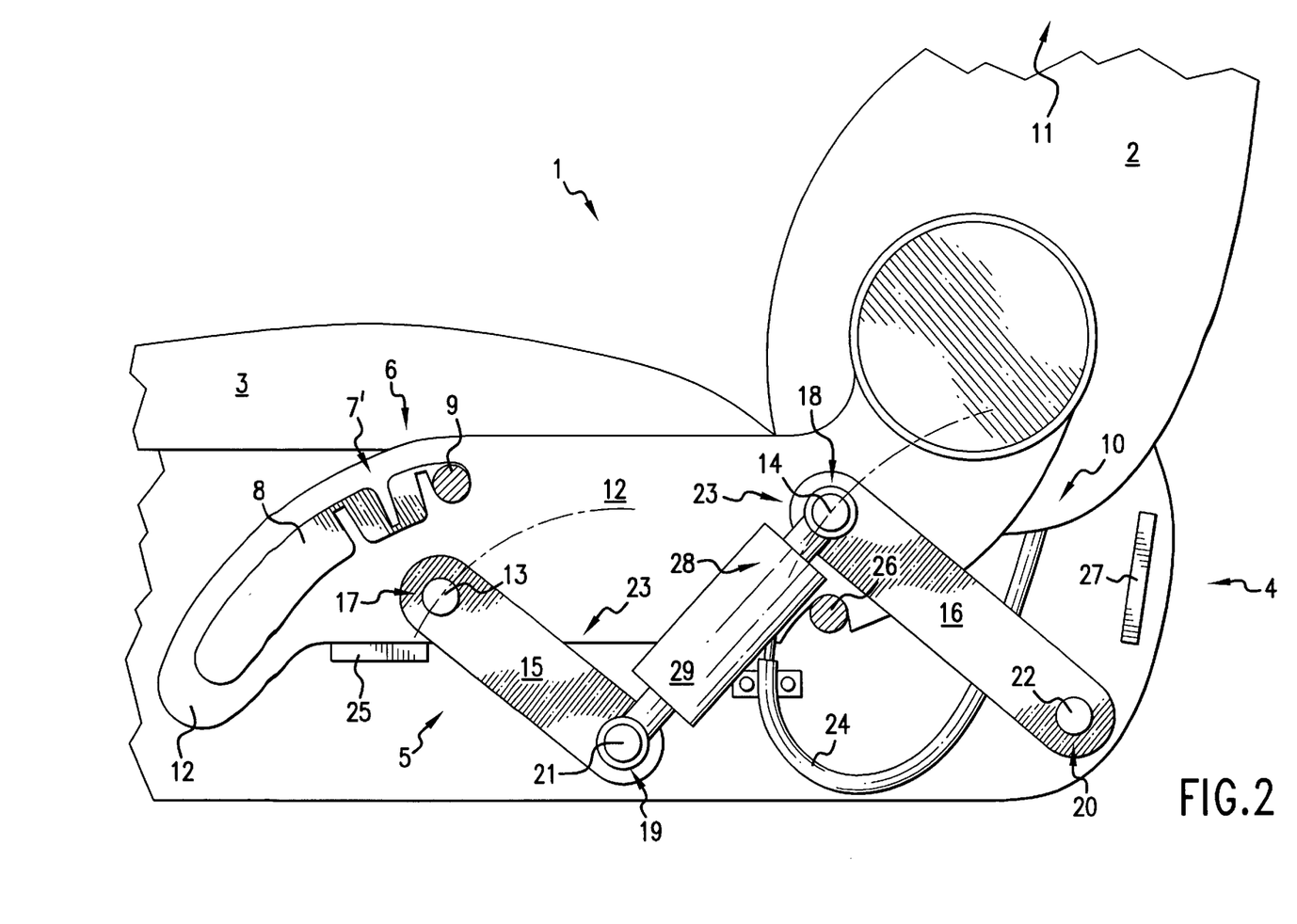
FIG. 2 is a schematic partial lateral view of a motor vehicle seat with a backrest adjusting device in a second embodiment.

The sequence of movements of the backrest part 2, as explained above, in the case of a second embodiment which is illustrated in FIG. 2 analogously to FIG. 1, is ensured by separate driving devices 28. First, it should be noted that the load limiting device 7' of this second embodiment acts only in an initial stage of the loading of the backrest part 2. When, after their activation, the driving devices 28 act upon the backrest part 2, a further load limiting would counteract the expenditures of the driving devices 28, which would make no sense. At most, a course of the effect of the driving devices 28 could be defined by the design of the load limiting device 7'.

The load limiting device 7' and/or the rearward stop 27 can act as load sensors which brakes or brake the movement of the buttocks end 10 of the backrest part 2 toward the rear impact.

In addition to the characteristics of the first embodiment, the variant illustrated in FIG. 2 also contains a pyrotechnical adjusting cylinder 29 as the driving devices 28. Without limitations, such a pyrotechnical adjusting cylinder may analogously be provided also on the other side of the motor vehicle seat 1 which is not visible in the figure. The pyrotechnical adjusting cylinder 29 is stationarily but swivellably mounted by means of one end on the seat part 3 which, as illustrated in FIG. 2, in the case of the embodiment shown there, takes place on the forward bearing journal 21, on which the lower end 19 of the forward lever 15 is also swivellably disposed. The other end of the pyrotechnical adjusting cylinder 29 is also stationarily and swivellably applied to the rearward bearing journal 14, to which the upper end 18 of the rearward longer lever 16 is also applied. If the pyrotechnical adjusting cylinder 29 is now triggered, which may basically take place by means of a rear impact sensor (not shown) or a switch (not shown) at a defined point of the load limiting device 7', the pyrotechnical adjusting cylinder 29 pushes its two linking points, that is, the bearing journals 18 and 19, further apart which has the result that the rearward lever 16 is swivelled toward the vehicle rear (not shown). Since the system of the two levers 15 and 16 forms a forced guidance or control 23, the forward shorter lever 15 is also correspondingly swivelled in a forced manner.

Because of the different lengths of the two levers 15 and 16, however, the holder 12 is not only swivelled upward and to the rear, as in a case in which both levers have the same length, but is also tilted so that its forward end (when the seat is viewed from the front) is tilted downward relative to the rearward end. In other words, when the backrest adjusting device 5 is operated, the holder 12 actually carries out a combined swivelling and tilting movement, in which the backrest part 2 also goes along, since, although it is as a rule individually adjusted, it is then fixedly connected with the holder 12.

With respect to the other designs, the second embodiment according to FIG. 2 corresponds to the first embodiment illustrated in FIG. 1.

Figure 3:
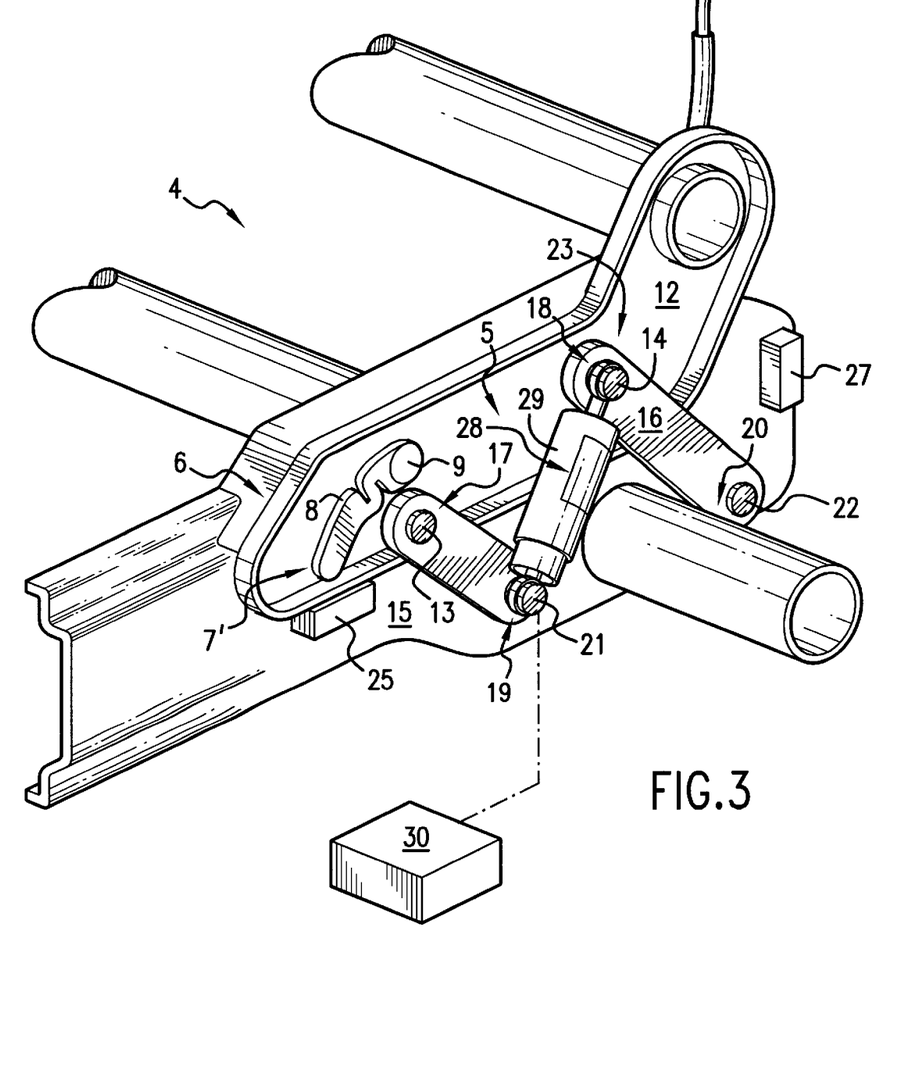
FIG. 3 is a schematic perspective partial view of a third embodiment of a backrest adjusting device of a motor vehicle seat.
Figure 4:
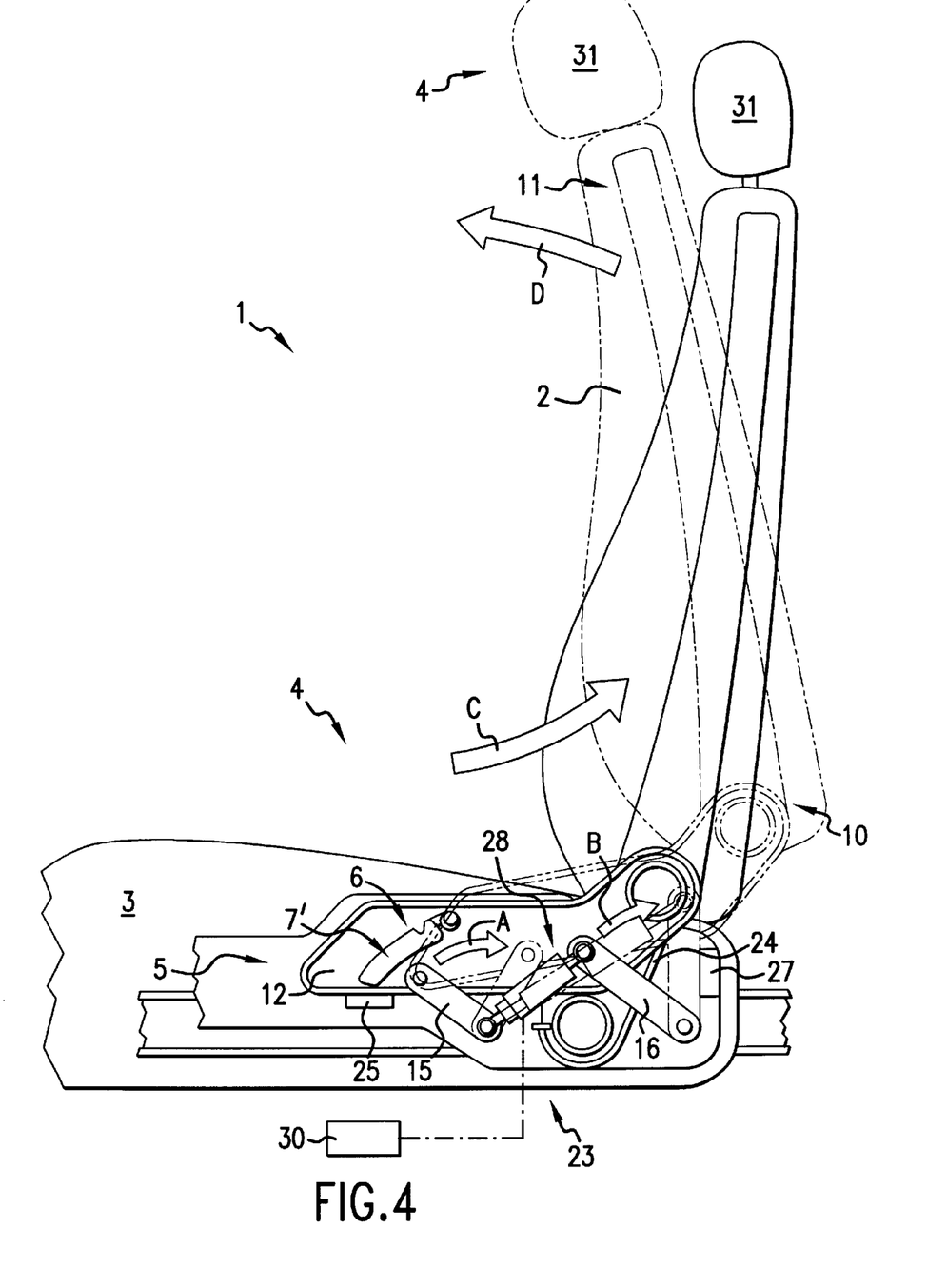
FIG. 4 is a schematic partial lateral view of an explanation of the functions of the third embodiment of the backrest dusting device of a motor vehicle seat of FIG. 3.

FIGS. 3 and 4 show a third embodiment of a motor vehicle seat 1, in which case, in order to avoid repetitions, in the following, only the changes are discussed with respect to the second embodiment described above with reference to FIG. 2. The analogies between the two mentioned embodiments are also indicated by the correspondingly identical reference numbers in the two figures, without having to be described separately.

FIG. 3 first schematically shows a rear impact sensor 30 which is designed for triggering the pyrotechnical adjusting cylinder 29 in the event of a rear impact accident with at least one defined force. FIG. 4 then shows the effects of the triggering of the pyrotechnical adjusting cylinder 29. The movements of individual parts which take place simultaneously are indicated by the arrows A, B, C, and D. In addition to the detonation during the ignition of the pyrotechnical adjusting cylinder 29, a detonation for triggering a headrest air bag (not shown) is also entered symbolically. In addition, by means of the comparison of the thickness of the headrest 31 in the initial position of the backrest part 2 illustrated by a solid line with the protective position of the backrest part 2 illustrated by the broken line, it is shown that the headrest 31 was also adjusted so that, in the adjusted position (illustrated by a broken line) it is closer to the occupant's (not shown) head and/or presses it farther toward the front. The operation of the adjustable headrest 31 takes place by way of a Bowden cable 24 which transmits the adjusting movement of the backrest adjusting device 5 to an adjusting mechanism (not shown) of the headrest 31.

Figure 5:
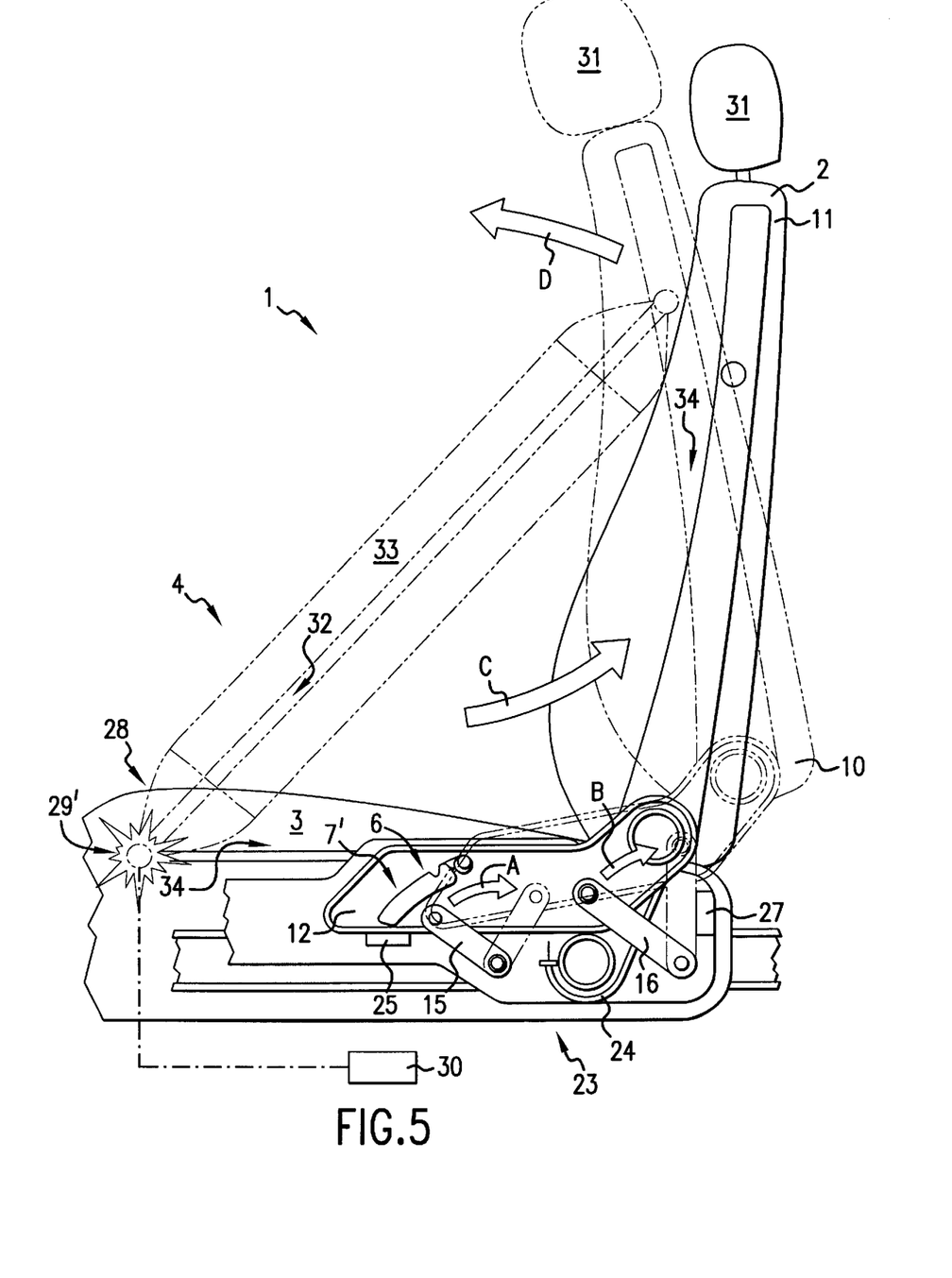
FIG. 5 is a schematic partial lateral view of an explanation of the functions of a fourth embodiment of the backrest adjusting device of a motor vehicle seat.

The movement sequences in the case of the headrest 31 are the same in the fourth embodiment of the motor vehicle seat 1 according to FIG. 5, as those indicated in connection with the third embodiment of the motor vehicle seat 1 illustrated in FIGS. 3 and 4. The backrest adjusting devices 5 of these two embodiments also basically correspond to one another, with the difference that the driving devices 28 of the fourth embodiment according to FIG. 5 have a pyrotechnical adjusting cylinder 29' which is simultaneously used for tensioning a tension cable 32 of a side air bag 33, so that the latter is pulled out of an accommodation space 34 in the sides of the seat part 3 and of the backrest part 2 into an operative position which is shown by a broken line in FIG. 5, before it is completely inflated. By means of the tension cable 32 a tensile force to the front toward the seat part 3 is applied to the area of the shoulder end 11 of the backrest part 2, whereby, because of the forced control 23, the combined tilting swivelling of the backrest part 2 is caused which was described in detail above concerning the second embodiment (see FIG. 2). Also in FIG. 5, the movements of individual parts of the motor vehicle seat 1 are illustrated by means of the arrows A, B, C and D. The rear impact sensor 30, which also triggers the headrest air bag, as symbolized by the schematically shown explosion, is also indicated schematically.

Without any limitation, the use of the tension cable 32 of the side air bag or thorax air bag 33 can be provided only as a booster of a separate drive of the backrest adjusting device 5 in the form of the pyrotechnical adjusting cylinder 29. It is also possible to operate, on the side of the motor vehicle seat 1 facing the exterior side of the vehicle (not shown), the adjusting movement of the backrest part finally by the pyrotechnical adjusting cylinder 29' of the side air bag system and, on the side of the motor vehicle seat 1 facing the vehicle center, by means of the separate pyrotechnical adjusting cylinder 29. The use of the side air bag system has the advantage that the backrest part 2 and the seat part 3 are fixedly braced with one another and an occupant is forced toward the vehicle center, which offers additional safety aspects.

In addition to the use of sensor devices, such as the rear impact sensor 30, for triggering or activating the backrest adjusting device 5, for example, by means of the driving devices 28, sensor devices may also be used for triggering and activating additional safety devices, such as belt tightening devices, headrest air bags, headrest adjusting devices and much more.

Figure 6:
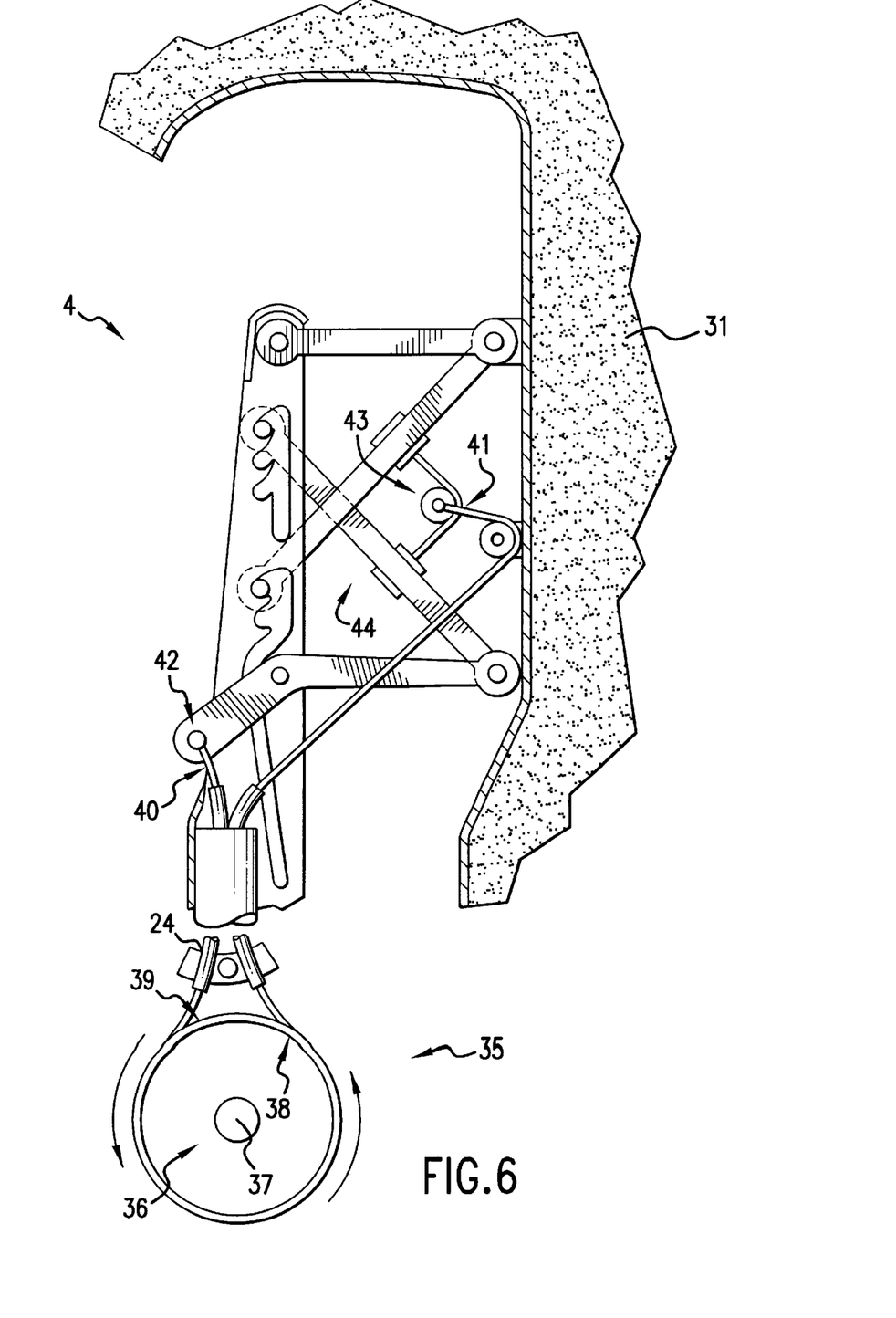
FIG. 6 is a vertical partial sectional view of an adjustable headrest as a component of a fifth embodiment of a motor vehicle seat according to the invention.

As also indicated in conjunction with the general representation of preferred embodiments in the introduction to the specification, preadjusting devices may also be provided which are shown, in the manner of an example, in FIG. 6 within the scope of a fifth embodiment of the motor vehicle seat 1. These preadjusting devices 35 contain an electric motor 36 which is designed for a rotation in both directions. On the shaft 37 of the electric motor 36, the bearing journal 14 is disposed which, in the case of this embodiment, is rigidly connected with the upper end 18 of the rearward lever 16 and is rotatably disposed in the holder (compare, for example, FIGS. 1 and 2). The housing 38 of the electric motor 16 itself is rigidly connected with the holder 12. Although basically the electric motor 36 could also be applied to the bearing journal 22 of the lower end 20 of the rearward lever 16, this type of construction would exclude the use of the drive of the electric motor 36 for adjusting also a headrest 31 if the backrest part 2 is to be adjustable with respect to the seat part. The reason is that, in the case of the fifth embodiment, it is provided that the electric motor 36 is also applied to a Bowden cable 24 which, in order to be able to be pulled in both directions, is guided in a loop-type manner around a driving wheel 39 of the electric motor 36. The two free ends 40 and 41 of the Bowden cable 24 are connected to operating ends 42 and 43 of a headrest adjusting mechanism 44 so that the headrest 31 can be tilted out and set back.

The activation of the electric motor 36 takes place as a function of sensors (not shown), by means of which an imminent and at least as a rule no longer avoidable rear impact is detected, for the purpose of which, for example, the speed and direction of an approach between the vehicle rear and an external object are determined.

The invention relates to a motor vehicle seat with safety adjusting devices as protection devices, and particularly safety adjusting devices for a seat in vehicles or airplanes. A special application of the invention relates to a seat mounting for adjusting the backrest in the event of a rear crash or impact and for adjusting the headrest in the case of a car. In other words, the present invention generally provides protection devices of a motor vehicle seat, with a backrest adjusting device which is formed essentially by a backrest mounting arrangement, in the case of which the backrest part or generally the backrest is connected on both sides to the seat part or the seat frame such that the body mass of an occupant in the event of a rear impact of the motor vehicle with at least one defined force, can push back the backrest in the buttocks area against a load limiting device. In the case of preferred embodiments, the mounting is in each case fastened to the seat frame by means of two swivellable control levers respectively. Because of the fact that the forward levers are shorter than the rearward levers, a tilting and swivelling movement is obtained. As a result, when acted upon from behind, for example, in the event of a rear crash, the backrest is tilted forward on top at the shoulder end, while it is simultaneously lifted. The occupant therefore remains farther down in the seat. By means of the backrest, an existing headrest is also lifted into a better protecting position. Further, a Bowden cable can be coupled to the movement of the mounting, which Bowden cable, for example, either swivels a headrest upward and forward or ignites the first stage of a headrest air bag.

The invention is not limited to the above-described concrete embodiments illustrated in the drawing. All variations, substitutions and changes which with the same or comparable effects lead to the same or similar results, can easily be recognized by a person skilled in the art as being part of the present invention on the basis of the present representation of the invention and are therefore also included in it.

Appendix—List of Reference Numbers

1 Motor vehicle seat
2 backrest part
3 seat part
4 protection devices
5 backrest adjusting device
6 release devices
7 load limiting device, load sensor
7' load limiting device
8 wave-shaped guide slot
9 holding pin
10 buttocks end of backrest part 2
11 shoulder end of backrest part 2
12 holder
13 forward bearing journal of holder 12
14 rearward bearing journal of holder 12
15 forward lever
16 rearward lever
17 upper end of forward lever 15
18 upper end of rearward lever 16
19 lower end of forward lever 15
20 lower end of the rearward lever 16
21 forward bearing journal on the seat part 3
22 rearward bearing journal on the seat part 3
23 forced control
24 Bowden pull
25, 26 forward supports for the holder 12
27 rearward stop for the rearward lever 16, load sensor
28 driving devices
29 pyrotechnical adjusting cylinder
29' pyrotechnical adjusting cylinder
30 rear impact sensor
31 adjustable headrest
32 tension cable
33 side air bag or thorax air bag
34 accommodation space
35 preadjusting devices
36 electric motor
37 shaft of electric motor
38 housing of electric motor
39 drive wheel of electric motor
40, 41 free ends of Bowden cable
42, 43 operating ends
44 headrest adjusting mechanism
A and B movement arrows
C and D movement arrows.

What is claimed is:

1. Motor vehicle seat to be arranged in a fore and aft direction in a motor vehicle so a person occupying the seat faces forward in the normal forward direction of travel of the motor vehicle comprising:

(1) a seat part, (2) a backrest part situated aft of the seat part, (3) a holder member carried by the backrest part extending forwardly alongside the seat part and lying adjacent to the seat part with portions of the seat part situated below the holder member, (4) a load limiting device comprising mutually cooperating members defined by the adjacent lying portions of the seat part and the holder member for holding the seat part and the holder member, and in turn, the backrest part in a fixed relative juxtaposition, but allowing the seat part to move rearwardly relative to the backrest part when subjected to a rear impact of greater than a given force, (5) a first linkage, inclined forwardly, pivotally mounted at one end to the holder member, and at its other end to the portion of the seat part lying below the holder member, (6) a second linkage, inclined forwardly, mounted rearwardly of the first linkage with one end pivotally mounted to the holder, and its other end pivotally mounted to the portion of the seat part lying below the holder member, (7) the second linkage being longer than the first linkage, and (8) the load limiting device, upon activation by a rear impact of greater than the given force, allowing the seat part to move rearwardly relative to the holder member, and in turn, the backrest part, while said first and second linkages pivot in response to such movement to cause the backrest part to tend to tilt forwardly.

2. Motor vehicle seat comprising:

(1) a seat, for a person to sit in the motor vehicle facing forward in the normal forward direction of travel of the motor vehicle, including a seat part and a backrest part, (2) a holder member carried by the backrest part extending forwardly alongside the seat part with portions of the seat part below the holder member, (3) the seat part and the forward part of the holder member defining mutually cooperating elements which normally maintain a fixed relative juxtaposition between the seat part and the backrest part, but when experiencing a rear impact of greater than a given force allowing the seat part to move rearwardly relative to the holder member and backrest part, (4) a backrest adjusting device including pivotal linkages interconnecting the portion of the seat part below the holder member and the holder member, actuated responsive to rearward movement of the seat part to tend to pivot the upper portion of the backrest part forward and prevent the backrest part from bending rearward due to the rear impact.

3. Motor vehicle seat according to claim 2, wherein the backrest part has a buttocks end facing the seat part and a shoulder end remote from the seat part, and wherein, after activation of the mutually cooperating elements, the backrest adjusting device acts to swivel the backrest part such that, the buttocks end is adjusted toward the rear impact and the shoulder end is adjusted away from the rear impact.

4. Motor vehicle seat according to claim 3, wherein the movement of the buttocks end of the backrest part is brakable in the direction of the rear impact via a load sensing device.

5. Motor vehicle seat according to claim 3, wherein the backrest adjusting device is designed such that, after its release, it acts to adjust the backrest part upwards relative to the seat part.

6. Motor vehicle seat according to claim 5, wherein the backrest part is connected on both sides of the motor vehicle seat by way of one holder respectively with the seat part, and wherein the backrest adjusting device contains a forced control which acts between the seat part and the holders of the backrest part.

7. Motor vehicle seat according to claim 5, wherein the forced control contains on both sides of the motor vehicle seat one forward and one rearward lever respectively which are, in each case, rotatably disposed on their lower ends on the seat part and on their upper ends on the corresponding holder, and of which the rearward levers, which are closer to the motor vehicle rear, are longer than the forward levers, the forward and rearward levers extending in the direction away from a rear of the vehicle diagonally upwards and at least essentially in parallel to one another, when the backrest adjusting device is not released, and wherein, when the backrest adjusting device is released, the forward and rearward levers can be adjusted in the direction of the rear impact.

8. Motor vehicle seat according to claim 5, wherein the backrest adjusting device contains driving devices which, after the release of the backrest adjusting device, at least promote or cause an action upon the backrest part so that the backrest part counteracts an occupant's sliding-up as the result of the rear impact, and further wherein the driving devices are coupled with the forced control.

9. Motor vehicle seat according to claim 8, wherein the driving devices contain at least one pyrotechnical adjusting cylinder.

10. Motor vehicle seat according to claim 9, wherein a pyrotechnical adjusting cylinder is operatively coupled on one side of the motor vehicle seat, on the one side, stationarily to the seat part and, on the other side, on an upper end of a rearward lever.

11. Motor vehicle seat according to claim 10, wherein a pyrotechnical adjusting cylinder is part of a side air bag system housed in the motor vehicle seat and is designed in order to, on the one hand, pull a side air bag from an accommodation space into an operative position via a tension cable which, on the one side, is coupled in the area of the shoulder end of the backrest part and, on the other side, is coupled with the adjusting cylinder which, after a triggering of the side air bag system, tensions the tension cable toward the forward free end of the seat part, and in order to, on the other hand, by tensioning the tension cable, after the release of the backrest adjusting device, act upon the backrest part so that the backrest part counteracts an occupant's sliding-up as the result of the rear impact.

12. Motor vehicle seat according to claim 10, wherein for activation, the driving devices are coupled with sensor devices for detecting a rear impact.

13. Motor vehicle seat according to claim 9, wherein a pyrotechnical adjusting cylinder is part of a side air bag system housed in the motor vehicle seat and is designed in order to, on the one hand, pull a side air bag from an accommodation space into an operative position via a tension cable which, on the one side, is coupled in the area of the shoulder end of the backrest part and, on the other side, is coupled with the adjusting cylinder which, after a triggering of the side air bag system, tensions the tension cable toward the forward free end of the seat part, and in order to, on the other hand, by tensioning the tension cable, after the release of the backrest adjusting device, act upon the backrest part so that the backrest part counteracts an occupant's sliding-up as the result of the rear impact.

14. Motor vehicle seat according to claim 13, wherein for activation, the driving devices are coupled with sensor devices for detecting a rear impact.

15. Motor vehicle seat according to claim 9, wherein for activation, the driving devices are coupled with sensor devices for detecting a rear impact.

16. Motor vehicle seat according to claim 8, wherein for activation, the driving devices are coupled with sensor devices for detecting a rear impact.

17. Motor vehicle seat according to claim 5, wherein the backrest part is connected on both sides of the motor vehicle seat by way of one holder respectively with the seat part, and wherein the backrest adjusting device contains a forced control which acts between the seat part and the holders of the backrest apart.

18. Motor vehicle seat according to claim 17, wherein the forced control contains on both sides of the motor vehicle seat one forward and one rearward lever respectively which are, in each case, rotatably disposed on their lower ends on the seat part and on their upper ends on the corresponding holder, and of which the rearward levers, which are closer to the motor vehicle rear, are longer than the forward levers, the forward and rearward levers extending in the direction away from a rear of the vehicle diagonally upwards and at least essentially in parallel to one another, when the backrest adjusting device is not released, and wherein, when the backrest adjusting device is released, the forward and rearward levers can be adjusted in the direction of the rear impact.

19. Motor vehicle seat according to claim 2 wherein the backrest adjusting device contains driving devices which, after the release of the backrest adjusting device, at least promote or cause an action upon the backrest part so that the backrest part counteracts an occupant's sliding-up as the result of the rear impact.

20. Motor vehicle seat according to claim 19, wherein for activation, the driving devices are coupled with sensor devices for detecting a rear impact.

21. Motor vehicle seat according to claim 19, wherein, for activation, the driving devices are coupled with sensor devices for detecting a rear impact, and further wherein the sensor devices are coupled with the release devices in order to trigger the driving devices only when the backrest adjusting device is released.

22. Motor vehicle seat according to claim 2 wherein the backrest adjusting device, which can be released in the event of a rear impact, contains preadjusting devices which are coupled with sensor devices for detecting an imminent rear impact and, after the release of the backrest adjusting device, adjust the backrest part such that the backrest part counteracts an occupant's sliding-up movement as the result of the rear impact.

23. Motor vehicle seat according to claim 22, wherein the preadjusting devices contain an electric or hydraulic drive which is coupled with a forced control of the backrest part, in that the backrest part has a buttocks end facing the seat part and a shoulder end facing away from the seat part, and wherein, after the release of the backrest adjusting device, the forced control, by way of the electric or hydraulic drive causes a swivelling of the buttocks end and of the shoulder end of the backrest part relative to one another such that, relative to the respective position before the operation of the preadjusting devices, the buttocks end can be adjusted toward the rear impact and/or the shoulder end can be adjusted away from the rear impact.

24. Motor vehicle seat according to claim 23, wherein, after the release of the backrest adjusting device, by way of the electric or hydraulic drive, the forced control causes an adjustment of the backrest part from the seat part in an upward direction.

25. Motor vehicle seat according to claim 2, further including a stop for limiting the movement of the backrest part.

26. Motor vehicle seat according to claim 2, wherein the backrest adjusting device, for the joint or mutually caused triggering or activating, is combined with additional safety devices which are at least assigned to the motor vehicle seat.

27. Motor vehicle seat according to claim 26, wherein the additional safety devices comprise a side air bag, a headrest air bag, a headrest adjusting device and/or one or more belt tightening devices.

28. Motor vehicle seat according to claim 2 wherein the mutually cooperating elements constitute a load limiting device.

29. Motor vehicle seat according to claim 28 wherein the load limiting device is activated as a function of at least one of the force of the rear impact, the type of the rear impact and the occupant's weight on the motor vehicle seat.

30. A process for operating a motor vehicle seat comprising the steps of
   (a) establishing a seat part and a backrest part in relative juxtaposition by a holder member carried by the backrest part that extends forwardly alongside the seat part, said seat part and holder member defining mutually cooperating elements which normally maintain a fixed relative juxtaposition between the seat part and the backrest part, but when experiencing a rear impact of greater than a given force, allowing the seat part to move rearwardly relative to the holder member and backrest part,
   (b) activating a transition of the juxtaposition of the seat part and the backrest part in the event of a rear impact of greater than a given force,
   (c) controlling the transition of the juxtaposition through a pivotal movement by linkages pivotally mounted to the holder member and to portions of the seat part lying below the holder member to pivot the upper portion of the backrest part forward and prevent the backrest part from bending rearward due to the rear impact.

31. The process according to claim 30 wherein when the motor vehicle seat is mounted in a driving direction, the act of controlling the backrest part further comprises the acts of:
   adjusting a buttocks end of the backrest part toward the rear impact and/or a shoulder end away from the rear impact into the protective position relative to the backrest part position prior to the rear impact.

32. The process according to claim 31, further comprising the act of additionally adjusting the backrest part upwards relative to the seat part into the protective position with respect to the position of the backrest part prior to the rear impact.

33. The process according to claim 32, further comprising the acts of:
   initially detecting the rear impact via sensor devices; and
   promoting or causing the backrest part to be controlled into the protective position via driving devices coupled with the sensor devices.

34. The process according to claim 32, further comprising the acts of:
   detecting an imminent rear impact via sensor devices; and
   adjusting the backrest part into the protective position before the imminent rear impact via preadjusting devices coupled with the sensor devices.

35. The process according to claim 31, further comprising the act of initially detecting the rear impact via sensor devices; and promoting or causing the backrest part to be controlled into the protective position via driving devices coupled with the sensor devices.

36. The process according to claim 31, further comprising the acts of:

detecting an imminent rear impact via sensor devices; and adjusting the backrest part into the protective position before the imminent rear impact via preadjusting devices coupled with the sensor devices.

37. The process according to claim 30, further comprising the act of initially detecting the rear impact via sensor devices; and promoting or causing the backrest part to be controlled into the protective position via driving devices coupled with the sensor devices.

38. The process according to claim 37, further comprising the acts of:

detecting an imminent rear impact via sensor devices; and adjusting the backrest part into the protective position before the imminent rear impact via preadjusting devices coupled with the sensor devices.

39. The process according to claim 30, further comprising the acts of:

detecting an imminent rear impact via sensor devices; and adjusting the backrest part into the protective position before the imminent rear impact via preadjusting devices coupled with the sensor devices.

* * * * *